US007675856B2

(12) United States Patent (10) Patent No.: US 7,675,856 B2
Padmanabhan et al. (45) Date of Patent: Mar. 9, 2010

(54) BANDWIDTH ESTIMATION IN BROADBAND ACCESS NETWORKS

(75) Inventors: Venkata N. Padmanabhan, Bellevue, WA (US); Jitendra D. Padhye, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1186 days.

(21) Appl. No.: 11/089,246

(22) Filed: Mar. 24, 2005

(65) Prior Publication Data

US 2006/0215574 A1 Sep. 28, 2006

(51) Int. Cl.
*H04J 1/16* (2006.01)
(52) U.S. Cl. .................. 370/235; 370/248; 370/395.41; 370/468
(58) Field of Classification Search ................. 370/252, 370/253, 230, 235, 234, 236, 248, 395.41, 370/468
See application file for complete search history.

(56) References Cited

U.S. PATENT DOCUMENTS

| 5,280,629 | A | * | 1/1994 | Lo Galbo et al. | 455/503 |
| 5,521,907 | A | * | 5/1996 | Ennis et al. | 370/253 |
| 5,812,528 | A | * | 9/1998 | VanDervort | 370/235 |
| 5,878,032 | A | * | 3/1999 | Mirek et al. | 370/252 |
| 6,012,096 | A | * | 1/2000 | Link et al. | 709/233 |
| 6,058,102 | A | * | 5/2000 | Drysdale et al. | 370/252 |
| 6,272,539 | B1 | * | 8/2001 | Cuomo et al. | 709/223 |
| 6,321,264 | B1 | * | 11/2001 | Fletcher et al. | 709/224 |
| 6,430,160 | B1 | * | 8/2002 | Smith et al. | 370/252 |
| 6,445,681 | B1 | * | 9/2002 | Pogrebinsky | 370/252 |
| 6,454,979 | B1 | * | 9/2002 | Phinney | 264/117 |
| 6,545,979 | B1 | * | 4/2003 | Poulin | 370/241.1 |
| 6,769,029 | B1 | * | 7/2004 | Seki et al. | 709/232 |

(Continued)

FOREIGN PATENT DOCUMENTS

EP 1 335 525 A2 8/2003

(Continued)

OTHER PUBLICATIONS

Karthik Lakshminarayanan Venkata N. Padmanabhan Jitendra Padhye, University of California at Berkeley Microsoft Research Microsoft Research, Bandwidth Estimation in Broadband Access Networks, IMC'04, Oct. 25-27, 2004, Taormina, Sicily, Italy, pp. 1-8.*

(Continued)

*Primary Examiner*—Ricky Ngo
*Assistant Examiner*—Dewanda Samuel
(74) *Attorney, Agent, or Firm*—Wolf, Greenfield & Sacks, P.C.

(57) ABSTRACT

Measurement systems according to embodiments of the invention allow accurate bandwidth estimation even in non-FIFO scheduling and frame-level contention environments. In an embodiment of the invention, the approximate fraction of time that a link is idle is found by probing for idle periods ("gaps"). The fraction of idle time is then multiplied by the capacity to obtain an estimate of the available bandwidth. Gap time is estimated in an embodiment of the invention fraction by gathering samples of one-way delay (OWD) over the link in question. After the OWD is normalized and plotted, the knee in the cumulative distribution function (CDF) of OWD samples is used to identify the fraction of time that the channel is idle.

12 Claims, 8 Drawing Sheets

U.S. PATENT DOCUMENTS

| | | | |
|---|---|---|---|
| 6,795,401 B1 | 9/2004 | Fukuoka | |
| 6,813,244 B1 | 11/2004 | He et al. | |
| 6,831,890 B1 * | 12/2004 | Goldsack et al. | 370/229 |
| 6,839,754 B2 * | 1/2005 | Nowak et al. | 709/224 |
| 6,853,619 B1 * | 2/2005 | Grenot | 370/232 |
| 6,996,132 B1 * | 2/2006 | Tolety | 370/517 |
| 7,012,900 B1 | 3/2006 | Riddle | 370/252 |
| 7,092,410 B2 * | 8/2006 | Bordonaro et al. | 370/516 |
| 7,120,125 B2 * | 10/2006 | Kikuchi et al. | 370/252 |
| 7,133,368 B2 * | 11/2006 | Zhang et al. | 370/249 |
| 7,180,858 B1 * | 2/2007 | Roy et al. | 370/232 |
| 7,239,611 B2 * | 7/2007 | Khisti et al. | 370/230 |
| 7,292,537 B2 * | 11/2007 | Charcranoon | 370/252 |
| 7,342,923 B2 | 3/2008 | Botvich | |
| 7,355,971 B2 | 4/2008 | Jason, Jr. | |
| 7,359,835 B2 * | 4/2008 | Vogel et al. | 702/188 |
| 7,443,804 B2 | 10/2008 | Cheung et al. | |
| 7,453,885 B2 | 11/2008 | Rogers | |
| 7,460,480 B2 | 12/2008 | Awais | |
| 2001/0051992 A1 * | 12/2001 | Yang et al. | 709/207 |
| 2002/0044528 A1 | 4/2002 | Pogrebinsky et al. | |
| 2003/0115321 A1 * | 6/2003 | Edmison et al. | 709/224 |
| 2005/0220035 A1 | 10/2005 | Ling et al. | |
| 2006/0114859 A1 | 6/2006 | Sudo et al. | |
| 2006/0215574 A1 | 9/2006 | Padmanabhan et al. | |
| 2006/0215577 A1 * | 9/2006 | Guichard et al. | 370/254 |
| 2006/0268825 A1 | 11/2006 | Westerberg | |
| 2007/0086485 A1 | 4/2007 | Vega-Garcia et al. | |
| 2007/0115814 A1 * | 5/2007 | Gerla et al. | 370/230 |

FOREIGN PATENT DOCUMENTS

EP         1335525 A2 *    8/2003

OTHER PUBLICATIONS

Lai, K., et al., "Measuring Link Bandwidths Using a Deterministic Model of Packet Delay", ACM SIGCOMM, Aug. 2000.
Strauss, J., et al., "*A Measurement Study of Available Bandwidth Estimation Tools*" ACM/USENIX IMC, Oct. 2003.
Lakshminarayanan, Karthik, et al., "Bandwidth Estimation in Broadband Access Networks", IMC '04, Oct. 25-27, 2004, Taormina, Sicily, Italy, (8 pages).
Pasztor et al., "Active Probing using Packet Quartets", ACM ISBN 1-58113-603-X/02/0011 (Nov. 2002).
Extended Search Report dated May 17, 2006 from European Application No. 06111617.

* cited by examiner

| Cross-Traffic | | Estimate | | | | Measured | |
|---|---|---|---|---|---|---|---|
| Rate | Payload (Bytes) | Pathload | Spruce | ProbeGap | | | |
| | | | | 300 | 1472 | 300 | 1472 |
| 2 | 300 | 5.7 – 5.7 | 1.2 | 4.7 | 13.1 | 5.1 | 13.9 |
| | 1472 | 8.6 – 10.1 | 25.7 | 6.1 | 17.0 | 5.5 | 18 |
| 4 | 300 | 2.6 – 2.9 | 0 | 0.8 | 2.3 | 0.3 | 0.3 |
| | 1472 | 2.6 – 2.7 | 20.9 | 2.6 | 7.3 | 2.7 | 7.5 |

BANDWIDTH ESTIMATION IN BROADBAND ACCESS NETWORKS

FIELD OF THE INVENTION

This invention pertains generally to computer networking and, more particularly, to a method and system of estimating bandwidth over a network path.

BACKGROUND OF THE INVENTION

The essence of computer networking, be it wired or wireless, is the ability to transfer information from one computing device to another. The types of information transferred typically include control information, e.g. information pertaining to establishing or managing the network connection, and application data, e.g., information being transferred from or on behalf of some application level entity. Application data can make especially stringent demands of network capacity. Examples of application data include audio and video information, text, graphics, etc.

In a networking environment it is often important for entities involved in networking tasks to be able to estimate how much bandwidth is or could be available for a particular use. For example, if insufficient bandwidth is available, then it may not make sense to start a task that would have to be performed inadequately or later aborted. Alternatively, given an estimation of bandwidth, it may be possible for the application to adapt, e.g., switch to a lower-quality stream. Often the streaming transmission of audio and video information requires a certain quality of service in order to provide a satisfactory user experience, and if that quality of service is not available then the user experience will be lacking.

The bandwidth of a particular network path is typically not constant, but rather varies, sometimes substantially, in time. A number of factors may impact bandwidth at any particular time. For example, a number of applications or machines competing for bandwidth can diminish the bandwidth available to any one entity. Moreover, cross traffic at nodes in a path also affect bandwidth on that path. In wireless networks, any number of additional factors can influence available bandwidth. For example, a number of devices and appliances emit radio frequency radiation that can interfere with wireless systems. Moreover, signal attenuation, whether due to distance or obstructions, can also affect the bandwidth.

A number of end-to-end techniques have been developed for measuring network capacity and available bandwidth. These techniques assume that the constrained link can be modeled as a point-to-point link with a well-defined bandwidth, serving packets in first in first out (FIFO) order. However, a number of networks such as broadband access networks do not fit model. Such networks include, for example, cable modem and 802.11-based wireless networks. These types of networks defy bandwidth estimation by present techniques for reasons including (1) employment of mechanisms such as token bucket rate regulation, (2) scheduling of packets in a non-FIFO manner, and (3) use of multiple distinct rates, which can also result in bursty cross-traffic patterns.

BRIEF SUMMARY OF THE INVENTION

Measurement systems according to embodiments of the invention allow accurate bandwidth estimation even in non-FIFO scheduling and frame-level contention environments. As used herein, the term "bandwidth" refers to a data rate (bits per second), not to a spectrum bandwidth (Hz). In an embodiment of the invention, a tool for available bandwidth estimation determines the approximate fraction of time that a link is idle by probing for idle periods ("gaps"), and then multiplying by the capacity (estimated separately) to obtain an estimate of the available bandwidth. Idle period is estimated in an embodiment of the invention by gathering samples of one-way delay (OWD) over the link in question. After the OWD is normalized and plotted, the knee in the CDF of OWD samples is used to identify the fraction of time that the channel is idle. In an alternative embodiment of the invention, the round trip time is used instead of the OWD to estimate the available bandwidth.

In an embodiment of the invention the algorithm for identifying the knee in the CDF of OWD samples comprises (a) computing the slopes before and after each point on the CDF, (b) computing the angle between the before and after slopes, and (b) identifying as the knee the point at which the angle is largest. If the maximum angle is less than 10 degrees (i.e., there is not a prominent knee), then the knee is at the origin (0,0). Other techniques for finding the knee may be used as well in alternative embodiments of the invention, including maximum likelihood parameter estimation based on a model of the underlying OWD process, ratios of before and after slopes, etc.

In an embodiment of the invention, approximately 200 20-byte probe packets are sent over a 5 second interval to sample the one way delay in the link. In an alternative embodiment of the invention, packets are sent in small bunches of back-to-back packets and the maximum OWD in each bunch is used as the correct sample.

A useful publication for understanding the invention is "Bandwidth Estimation in Broadband Access Networks," K. Lakshminarayanan, V. Padmanabhan, and J. Padhye, IMC '04, Oct. 25-27, 2004, Taormina, Sicily, Italy, which is herein incorporated by reference in its entirety for all that it teaches or references, including the content of referenced work, without exclusion of any part thereof. Although the entire reference is of interest as indicated above, the discussion of the "ProbeGap" technique drafted by the present inventors is particularly pertinent.

Additional features and advantages of the invention will be apparent from the following detailed description of illustrative embodiments which proceeds with reference to the accompanying figures.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The present invention will be more completely understood through the following detailed description, which should be read in conjunction with the attached drawings. In this description, like numbers refer to similar elements within various embodiments of the present invention. Methods and systems for estimating bandwidth in broadband access networks and other networks will be described below. As used herein, the term "bandwidth" refers to a data rate (bits per second), not to a spectrum bandwidth (Hz). The skilled artisan will readily appreciate that the methods and systems described herein are merely exemplary and that variations can be made without departing from the spirit and scope of the invention.

Figure 1:
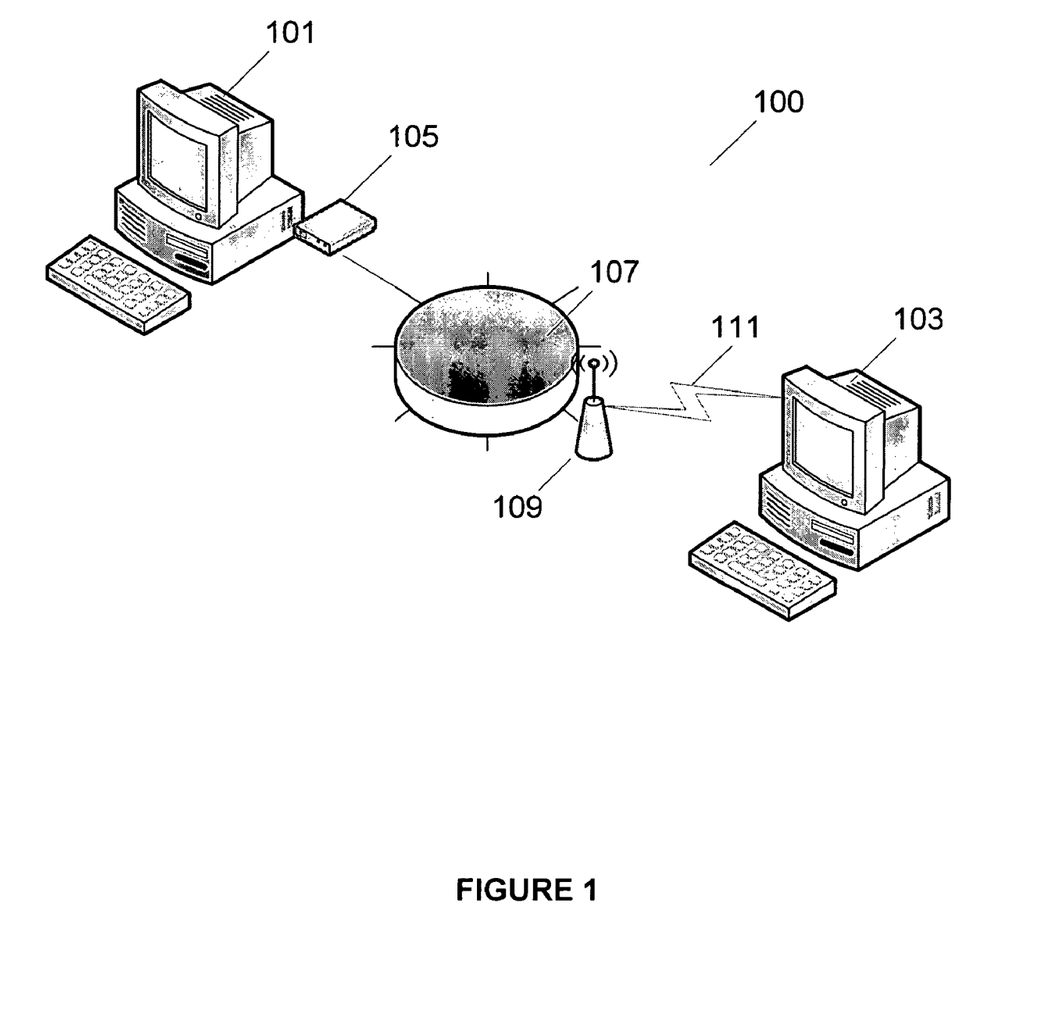
FIG. 1 is a schematic diagram of a generalized networking environment within which embodiments of the invention may be implemented.

A generalized networking environment within which embodiments of the invention may be implemented is shown in FIG. 1. As illustrated, in the computing environment 100, a computing device 101 is attached via a series of network links to another computing device 103. Although computing devices 101 and 103 are illustrated as PCs, no limitation is implied thereby, and other types of devices, similar or dissimilar, may be used as well. The network links connecting the computing devices 101 and 103 are illustrated as including a modem 105 linked to a LAN 107. The LAN 107 is in turn linked to an access point 109. Finally, the access point 109 is linked via wireless link 111 to computing device 103. The illustrated network 100 is merely an example, and any type(s) of network connection and number of links may be used.

Typically, information is transmitted from one computing device, such as computer 101, to another, such as computer 103. The bandwidths of the various links between the computers (e.g., links 105 and 111, as well as any traversed links in LAN 107) will determine the bandwidth experienced during the transmission of the information between the computers 101, 103. In order to for the transmission to be optimally configured, it is important for the sender to have an estimate of the bandwidth that will be available for the transmission. This is especially important for sustained transmissions such as streaming media data.

There has been work on developing techniques for estimating the capacity and available bandwidth of network paths based on end-point measurements. Capacity is defined as the bandwidth of the narrow link (i.e., the link with the smallest bandwidth) on a path. Available bandwidth refers to the headroom on the tight link; more precisely, it is the maximum rate that a new flow can send at without impacting the rate achieved by the existing flows on the tight link. The term "bandwidth" as used herein refers to the data rate of links or paths, typically expressed in bits per second. The bandwidth is, in general, a function of the packet size, due to per-packet overhead. As noted above, one primary reason for bandwidth estimation is to enable applications and end-host-based protocols to take advantage of bandwidth information in making intelligent choices on server selection, TCP ramp-up, streaming media adaptation, and so on.

Past attempts to solve the bandwidth estimation problem have assumed a simple model of network links. This model assumes that the constrained link along a path has a well-defined capacity that indicates the rate at which bits can be sent down the link. The link is assumed to be point-to-point with FIFO scheduling of all packets, including measurement probes and cross-traffic. Finally, the cross-traffic is assumed to be "fluid." This model will be referred to as the traditional model.

As noted above, many of the assumptions made in the traditional model break down in the context of broadband access networks such as cable modem and 802.11 networks. Such networks are rapidly proliferating, and are increasingly likely to be the constrained link on paths to and from end hosts such as home computers. Thus, the real life deviation of such networks from the assumed link model becomes significant. There are several reasons that the traditional model breaks down with respect to such networks. First, such a link may not have a fixed or well-defined raw bandwidth. For example, token-bucket rate regulation as in cable modems or dynamic multi-rate schemes as in 802.11 make it difficult to ascertain a fixed or well-defined raw bandwidth. A distinction should be made between the raw link bandwidth and the bandwidth seen by sustained streams. Second, the scheduling of packets may not be FIFO because of a fully distributed contention-based MAC as in 802.11 or a centrally coordinated MAC as in the cable modem uplink. Third, multi-rate 802.11 links can interfere to create highly bursty (i.e., non-constant with high variation) cross-traffic patterns that result in a significant departure from the preferred fluid model of cross-traffic.

The discussion below focuses on three primary issues. First, the characteristics of broadband networks that present challenges to existing techniques for capacity and available bandwidth estimation will be discussed. Second, a number of experiments in real broadband networks will be discussed. We will focus on the broadband links in isolation, rather than as part of wide-area Internet paths, to be able to specifically evaluate the broadband issues. Finally, a new available bandwidth estimation technique will be described. One primary goal of the new technique is to probe for "gaps" (i.e., idle periods) in the link by gathering one-way delay (OWD) samples.

Figure 2:
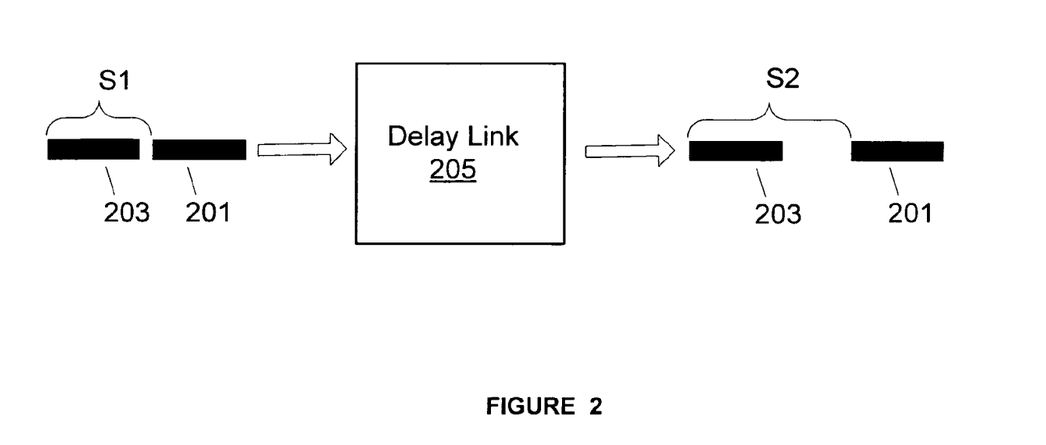
FIG. 2 is a schematic illustration of a packet pair experiment, showing packet delay dilation due to a bottleneck in the network path.

A number of the past proposed capacity estimation schemes are based on the packet-pair principle. In the packet pair technique illustrated schematically in FIG. 2, two packets 201, 203 of equal size are sent back-to-back, i.e., with no space between the packets, to the same destination. As the packets traverse the network, they encounter a transmission delay at each link equal to the packet size divided by the bandwidth of the link. At each of these links, the first packet 201 finishes transmission and speeds away while the second 203 is still being transmitted. As a result, the packets are spaced apart in time as they emerge from each link. The spacing is greatest at the narrow link (which has the lowest bandwidth) and is equal to the size of either packet divided by the narrow link bandwidth. This spacing is preserved all the way to the receiver, who can then compute an estimate of the narrow link bandwidth (i.e., path capacity). However, this technique suffers a great deal of inaccuracy due to cross-traffic and its affect on packet spacing.

To alleviate the problem of cross-traffic interference, various refinements have been proposed, including work directed to altering packet number and size and better filtering techniques to discard incorrect samples. The filtering problem is complicated by the multi-modality of the distribution of packet-pair spacing and the dominant mode may well not correspond to the capacity.

An alternative to the packet pair approach is to infer link capacity from the relationship between packet size and delay. However, delay measurement relies on ICMP time-exceeded messages from routers, which limits both the applicability and the accuracy of these tools. On the other hand, these tools do not rely on the FIFO assumption made in the traditional model discussed earlier.

Turning to available bandwidth estimation, early techniques measured the asymptotic dispersion rate rather than the available bandwidth. Many of the recently proposed techniques fall into two categories: packet rate method (PRM) and packet gap method (PGM). PRM-based tools, such as Pathload, PTR, Pathchirp, and TOPP, are based on the observation that a train of probe packets sent at a rate lower than the available bandwidth should be received at the sending rate on average. However, if the sending rate exceeds the available bandwidth, the received rate would be lower than the sending rate, and the probe packets would tend to queue up behind each other, resulting in an increasing OWD (one way delay) trend. Available bandwidth can be estimated by observing the sending rate at which a transition between the two modes occurs. The Pathload technique may be considered as a representative PRM-based tool.

PGM-based tools, such as Spruce, Delphi and IGI, send pairs of equal-sized probe packets, spaced apart according to the transmission time of the probes on the bottleneck link (i.e., the path capacity). If no cross-traffic gets inserted between the probes, then the inter-probe spacing is preserved at the receiver. Otherwise, the increase in the spacing is used to estimate the volume of cross-traffic, which is then subtracted from the capacity estimate to yield the available bandwidth. Unlike PRM, PGM assumes that the tight link is also the narrow link, and is susceptible to queuing delays at links other than the tight link. Spruce can be considered as being representative of PGM-based tools.

A proposed alternative approach to available bandwidth estimation measures the round trip time (RTT) of probe packets, and the change in RTT when a known amount of additional traffic is introduced. While this technique also uses delay information, it differs in operation from the novel technique described herein. In particular, it is much more intrusive (since it needs to introduce enough additional traffic to measurably affect the RTT of the probe packets), and it is also susceptible to asymmetry in link and cross-traffic characteristics given its dependence on RTT. In addition, there has been some work recognizing and addressing issues that arise in settings where the traditional link model breaks down. However, even in such work there has been no solution of the bandwidth estimation issues that arise in the context of broadband links.

The following discussion briefly exposes the characteristics of broadband networks that have an impact on estimation techniques for bottleneck bandwidth and available bandwidth. The discussion focuses primarily on two types of broadband access network technologies, namely cable modems and 802.11-based wireless technology. The latter is being used increasingly as the access technology in wireless hotspots, community wireless networks, etc.

As noted above, it has often been assumed that a link has a well-defined raw bandwidth that indicates the rate at which bits can be sent down the link. However, this assumption breaks down when a traffic regulation scheme is used. Typically, ISPs divide up a physical access link into smaller pieces that they then parcel out to customers. For example, the raw bandwidth of a typical DOCSIS-compliant cable modem network in North America is 27 Mbps downstream and 2.5 Mbps upstream (both per channel). However, the bandwidth that a customer is promised is typically an order of magnitude smaller, both in the upstream and the downstream directions.

To parcel out bandwidth in this way, a traffic regulation scheme is employed at the ISP end (e.g., the Cable Modem Termination System (CMTS), or cable "head-end") and/or the customer end (e.g., the Customer Premises Equipment (CPE), or cable modem). The mechanism used usually in cable modem networks is a token bucket regulator, which specifies the mean rate (in bits per second) as well as the maximum burst size (in bytes). Although the rate achievable by a sustained transfer is constrained by the mean rate, it is possible to send an amount of data corresponding to the token bucket depth at a rate equal to the raw link bandwidth. Thus we need to make a distinction between the raw link bandwidth and the maximum achievable rate for sustained transfers. It is possible that packet pairs or even short packet trains will measure the former whereas applications may be more interested in the latter.

Also as noted above, the traditional model assumes that all packets arriving at a link are serviced in FIFO order. Thus, a probe packet is assumed to experience a queuing delay commensurate with the total volume (in bytes) of the yet-to-be-serviced cross-traffic that preceded it in the queue. The size of the individual cross-traffic packets is therefore assumed to be non-critical. However, in an 802.11 wireless network, the stations contend for access to the channel in a distributed fashion. In the case of a cable modem uplink, the CMTS periodically sends out a control message indicating the time slots assigned to the various stations and inviting the stations to contend for unused slots. Although the downlink does not involve distributed contention, the inter-station scheduling policy employed by the CMTS might, in general, still be non-FIFO. Thus, in both settings, packets waiting at the different stations would not typically be transmitted in FIFO order.

One consequence of non-FIFO scheduling is that it may become harder in high-load situations to ensure that a packet pair goes through back-to-back (i.e., without any intervening cross-traffic). This is especially so when the MAC protocol tries to ensure fairness, either through explicit scheduling as in the cable modem uplink or through a distributed mechanism as in 802.11 (where a station that just finished transmitting a frame has a lower probability of winning the next round of contention compared to other stations that may have already partially counted down their backoff counters). The difficulty of sending packets back-to-back often impedes the operation of capacity estimation techniques.

Another consequence of non-FIFO scheduling is that a new probe packet enqueued at one of the stations might in fact be transmitted sooner than the older cross-traffic packets waiting at other stations. So the probe packet may not experience a delay commensurate with the total volume of cross-traffic, leading to underestimation of the volume of cross-traffic and hence overestimation of the available bandwidth. These issues become further complicated by the fact that contention/scheduling typically happens on a per-frame basis, regardless of frame size. Competing flows with different packet sizes would tend to get shares of bandwidth commensurate with their packet size. So the estimate produced by an available bandwidth estimation procedure might depend on the relative packet sizes of the probe traffic and the cross-traffic.

As noted above, multi-rate links also pose problems for bandwidth estimation. A number of link types may operate at and switch between multiple rates. For instance, 802.11b supports dynamic rate adaptation that allows a radio link to switch between 1, 2, 5.5, and 11 Mbps rates by switching modulation schemes depending on channel quality, which can vary dynamically due to mobility or environmental changes. Likewise, 802.11a supports rates ranging from 6 Mbps to 54 Mbps. Thus, for example, the raw bandwidth of the link between an access point (AP) and a wireless station could change abruptly.

Even if the link rate for each station does not change frequently, different stations in the same region could be operating at different rates, while still sharing the same wireless spectrum. Thus the impact that a given volume of cross-traffic on the link to one station has on the available bandwidth on another link depends on the rate at which the former link is operating. For example, consider two clients associated with an AP. The client trying to estimate available bandwidth can communicate with the AP at 54 Mbps, while the other client that is generating cross-traffic can communicate only at 6 Mbps (perhaps because it is further away). Since 802.11 contention happens on a per-frame basis, a single packet of cross-traffic sent on the 6 Mbps link would appear as a large burst of (approximately) 9 back-to-back packets from the viewpoint of the 54 Mbps link.

This has the potential of impacting both the PRM- and PGM-based techniques for available bandwidth estimation. These techniques work best when the cross-traffic conforms to the fluid model (i.e., has an infinitesimal packet size) so that it gets interspersed uniformly with the probe packets. The highly bursty cross-traffic pattern can make it more difficult for a PRM-based technique such as Pathload to detect a clear increasing trend when the probing rate exceeds the available bandwidth. Likewise, the burstiness might make it harder for a PGM-based technique such as Spruce to obtain an accurate sample of the cross-traffic.

Note that if the (non-FIFO) MAC protocol were perfectly fair, then it may in fact be feasible to estimate the fair share of a new flow, yielding an approximation of the throughput that a new TCP connection would receive. However, it is still useful to estimate the available bandwidth since it indicates the level to which a flow can quickly ramp up without negatively impacting existing traffic. For example, if the fair share of a new TCP flow is 3 Mbps but the available bandwidth is only 1 Mbps, the appropriate behavior would be to quickly ramp up to 1 Mbps and then use the standard TCP congestion control algorithm to gradually attain the fair share of 3 Mbps. Ramping up to 3 Mbps right away would likely be disruptive to the existing flows.

As another example, in an 802.11-based in-home digital A/V network, a key question is that of admission control; that is, can a new stream, for example from the home media center to a TV, be admitted without impacting existing streams? To address this issue, one must know the available bandwidth. Knowing the fair share alone, for example, is not as useful since it does not indicate whether the new stream would negatively impact existing streams in its attempt to attain its fair share.

Measurement systems according to embodiments of the invention largely alleviate the problems that non-FIFO scheduling and frame-level contention present for existing bandwidth measurement techniques. The new tool for available bandwidth estimation determines the approximate fraction of time that a link is idle by probing for "gaps" in the busy periods, and then multiplying by the capacity to obtain an estimate of the available bandwidth.

Figure 3:
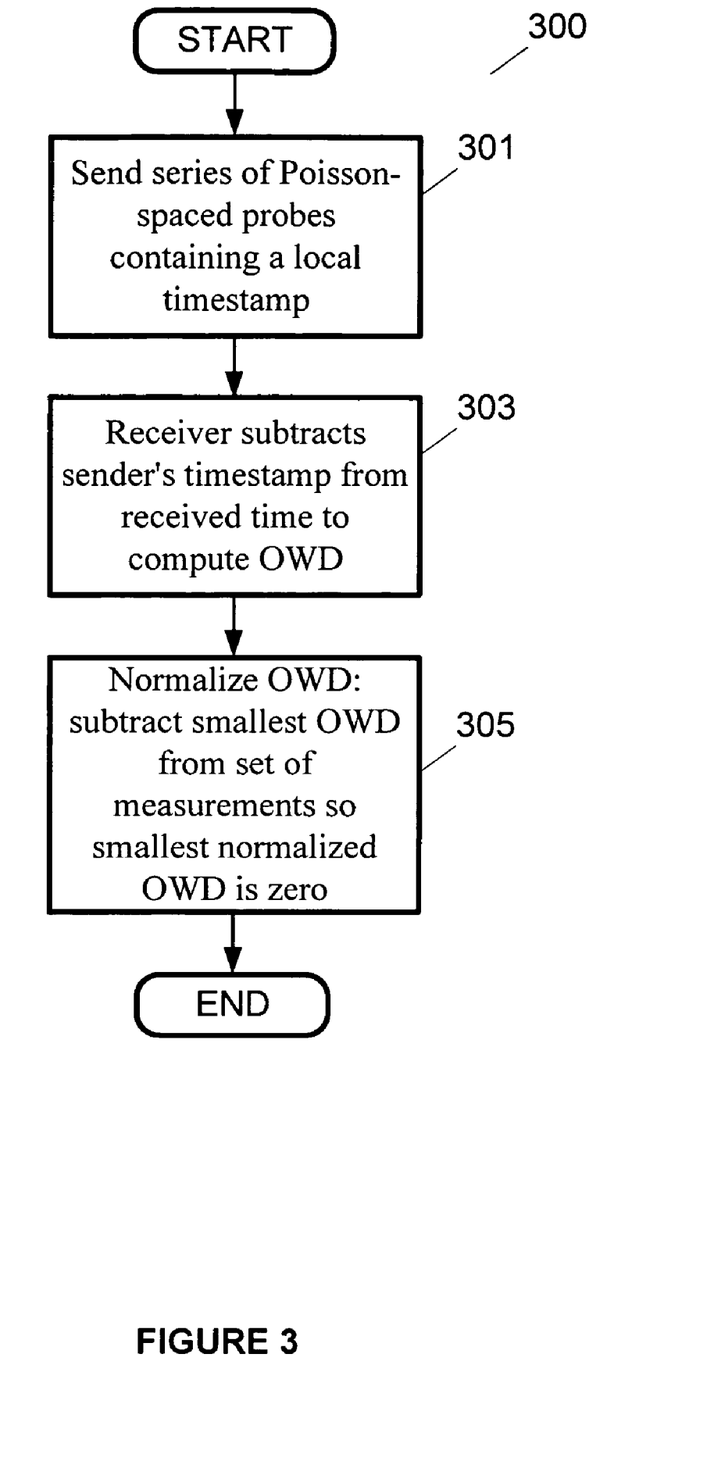
FIG. 3 illustrates a flow chart corresponding to a process of determining one way packet delay (OWD) according to an embodiment of the invention.

In particular, measurement systems according to embodiments of the invention estimate the idle time fraction by gathering samples of one-way delay (OWD) over the link. A process according to an embodiment of the invention for determining one way delay is shown in FIG. 3. At step 301 of flow chart 300, the sender sends a series of Poisson-spaced probes, each with a 20-byte payload containing a local timestamp. The receiver subtracts the sender's timestamp from the received time at step 303 to compute the OWD. The OWD is then "normalized" in step 305 by subtracting out the smallest OWD from the set of measurements, so that the smallest normalized OWD in the set is zero. The sender and receiver clocks need not be synchronized; they just need to maintain a constant offset, which we accomplish by using known techniques to compensate for clock skew.

Figure 4:
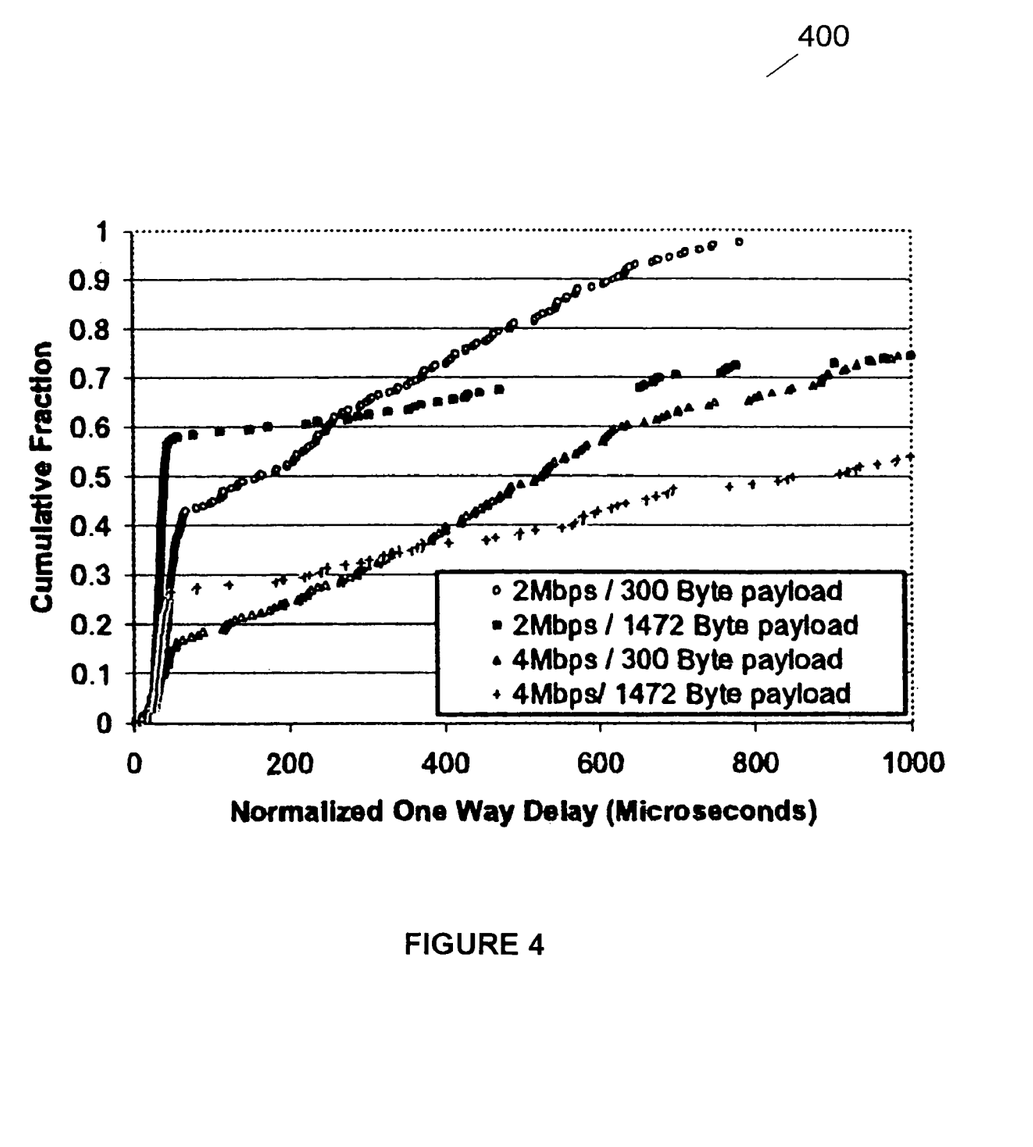
FIG. 4 is a plot of the CDF of one-way delay of 20-byte probe packets under various cross-traffic conditions wherein nominal channel capacity is 6 Mbp and wherein the detected OWDs were normalized according to an embodiment of the invention.

If a probe finds the link to be free, it would experience a small OWD. However, if it needs to wait for packets in transmission or ahead of it in the queue, it would experience a larger OWD. As illustrated in FIG. 4, the cumulative distribution function (CDF) 400 of OWD samples shows two distinct regions, the lower one corresponding to an idle channel and the higher one corresponding to a busy channel. Thus, the knee in the CDF 400 of OWD samples identifies the fraction of time that the channel is idle for each set of conditions. Note that FIG. 4 shows the CDF of one-way delay under various cross-traffic conditions. The nominal channel capacity is 6 Mbps. In the illustrated experiment, 20-byte probe packets were used, and the detected OWDs were normalized as discussed above to make the minimum OWD in each case equal to zero.

Figure 5:
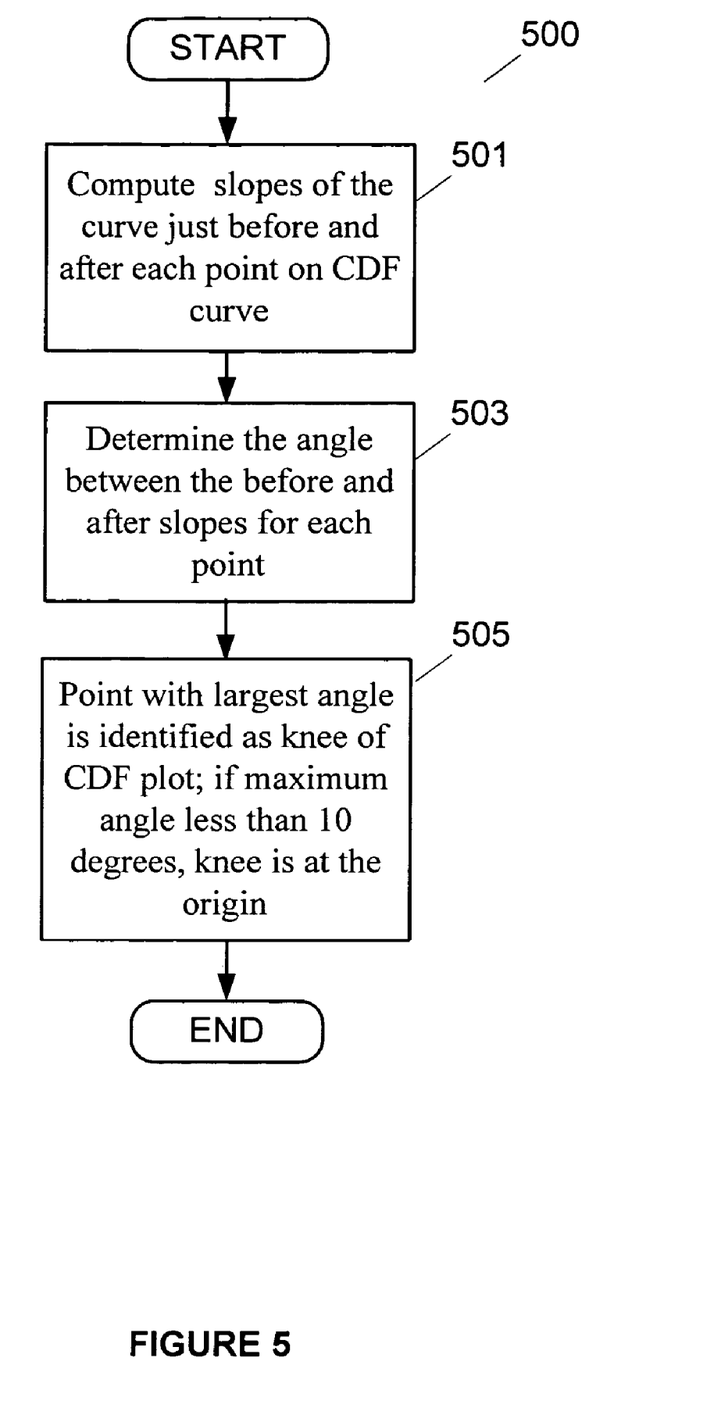
FIG. 5 illustrates a flow chart corresponding to a process of identifying the knee of the normalized delay plot according to an embodiment of the invention.

A process according to an embodiment of the invention for identifying the knee of the normalized delay plot is shown in the flow chart of FIG. 5. For each point on the CDF curve, the slopes of the curve before and after the point are computed at step 501 of flow chart 500. In step 503, the angle between the before and after slopes is determined. In step 505, the point at which the angle is largest is identified as the knee of the CDF plot. If the maximum angle is less than 10 degrees (i.e., there is not a prominent knee), then the knee is at the origin (0,0).

In an embodiment of the invention, as a further refinement to minimize the effect of noisy data, only points on the CDF curve with a normalized OWD of less than 1000 microseconds are considered as candidates for the knee. This does not tend to exclude the true knee, which typically has a normalized OWD that is much smaller than 1000 microseconds. Other techniques for finding the knee may be used as well, including maximum likelihood parameter estimation based on a model of the underlying OWD process.

The measurement system according to embodiments of the invention generally does not perturb the network under investigation, involving only about 200 20-byte probe packets sent over a 5-second interval. It is more immune than PGM and PRM techniques to the effects of non-FIFO scheduling, packet-level contention, and bursty cross-traffic, since cross-traffic in transmission is likely to be "noticed" (i.e., cause a measurable increase in OWD) regardless of the cross-traffic packet size or burst size, or which packet is scheduled for transmission next. However, the described technique is not entirely immune to the non-FIFO effects since there is a small chance that a probe packet will arrive exactly during the idle period between successive cross-traffic packets and win the following round of contention, thereby experiencing a small OWD.

In an embodiment of the invention, this problem is alleviated by sending probes in small bunches, for example two or three packets, of back-to-back packets and pick the maximum OWD in each bunch as the correct sample. If the channel is in fact idle, one would still measure a small OWD, given the small size of the probe packets. But if the channel is busy, it is very unlikely that all of the probes in a bunch will slip through with a small OWD, so one will probably measure a large OWD.

The wireless testbed consisted of 6 identical machines (2.4 GHz, 256 MB RAM), designated M1 through M6, located within range of each other. Each machine is equipped with a Netgear™ WAGS 11 802.11a/b/g NIC and operating in ad hoc mode. All experiments were carried out in 802.11a mode to avoid interfering with the production 802.11b network. typically, the link rate was set to 6 Mbps. In all experiments, the bandwidth estimation tools were run between M1 and M2, while the other nodes were used to generate cross-traffic.

For capacity estimation, we used Pathrate as described in C. Dovrolis, D. Moore, and P. Ramanathan, What Do Packet Dispersion Techniques Measure,? Proc. of IEEE INFOCOM, 2001, which subsumes much of the previous work on packet-pair- and packet-train-based capacity estimation. For available bandwidth estimation, we used Pathload as described in M. Jain and C. Dovrolis, End-to-End Available Bandwidth: Measurement Methodology, Dynamics, and Relation with TCP Throughput, Proc. Of ACMSIGCOMM, 2002, a PRM-based tool, and Spruce as described in J. Strauss, D. Katabi, and F. Kaashoek, A Measurement Study of Available Bandwidth Estimation Tools, Proc. of IMC, 2003, a PGM-based tool. In conjunction with these tools, we use the tool described herein for available bandwidth estimation. In our experiments, we set up Spruce to gather 1000 samples. We used a simple UDP traffic generator (udpload) to generate Poisson cross-traffic at various rates and packet sizes (exponential inter-packet spacing ensures that the cross-traffic exhibits more burstiness than a CBR stream).

The impact of packet size in 802.11 can also be significant. Since packet transmission with a contention-based MAC such as 802.11 involves significant per-packet overhead (e.g., the preamble and the minimum spacing between successive packets), we quantified the impact of packet size on the maximum achievable throughput by using the udpload tool to send a stream of back-to-back packets of various sizes. We also varied the number of simultaneously communicating node pairs from 1 to 3. In both cases, the cumulative throughput of the pairs increased significantly with the packet size, but did not depend strongly on the number of communicating pairs. Thus, the main source of throughput reduction is apparently the MAC-layer overhead, and not OS overhead at the individual senders or receivers. Otherwise the throughput would have increased with the number of pairs.

The impact of the contention-based 802.11 MAC is also significant. With respect to the estimation of channel capacity, we ran Pathrate between M1 and M2, while machines M3-M6 were used to generate cross-traffic at various rates and packet sizes. In all the runs, Pathrate produced a consistent estimate between 5.1 and 5.5 Mbps. This estimate is close to the maximum UDP traffic rate that the channel can support. To understand why Pathrate results are not affected by contention due to cross-traffic, we analyzed the log files produced by Pathrate and found that Pathrate was always able to find a mode between 5.1-5.3 Mbps, indicating that at least some probes go out back-to-back. This is because although 802.11's contention procedure has a bias against the node that just finished transmitting a packet, there is still a non-trivial probability that the same node will win the next round of contention, especially when the number of contending stations is small. The mode at 5.1-5.3 Mbps is not the dominant mode, especially under heavy cross-traffic. However, the asymptotic dispersion measurements usually generate a mode that includes at least part of the lower-rate mode(s), so these are de-emphasized. Thus, the tool described herein always selects the higher mode in an embodiment of the invention, resulting in the correct capacity estimate.

With respect to the estimation of available bandwidth, we examined each of the available bandwidth estimation tools, Pathload and Spruce, as well as an embodiment of the present invention. These tools were always run between M1 and M2, while cross traffic was generated between M3 and M4. We varied the rate of cross-traffic, from 1 to 4 Mbps in steps of 1 Mbps. We considered two packet sizes for the cross-traffic: 300 and 1472 bytes. For validation, we measured the available bandwidth using the validation technique described above, using both 300 and 1472-byte packet sizes for the measurement stream. Note that for the rates we are considering, Pathload uses 300-byte probe packets. So we only compared Pathload's estimates with the measured available bandwidth 300-byte packets. Also, since Spruce uses 1472-byte probes, we specify the capacity as 5.1 Mbps and only compared Spruce's estimates with the measured available bandwidth for 1472-byte packets. In contrast, we compare estimates made by embodiments of the invention with the measured available bandwidth for both packet sizes.

Figure 6:
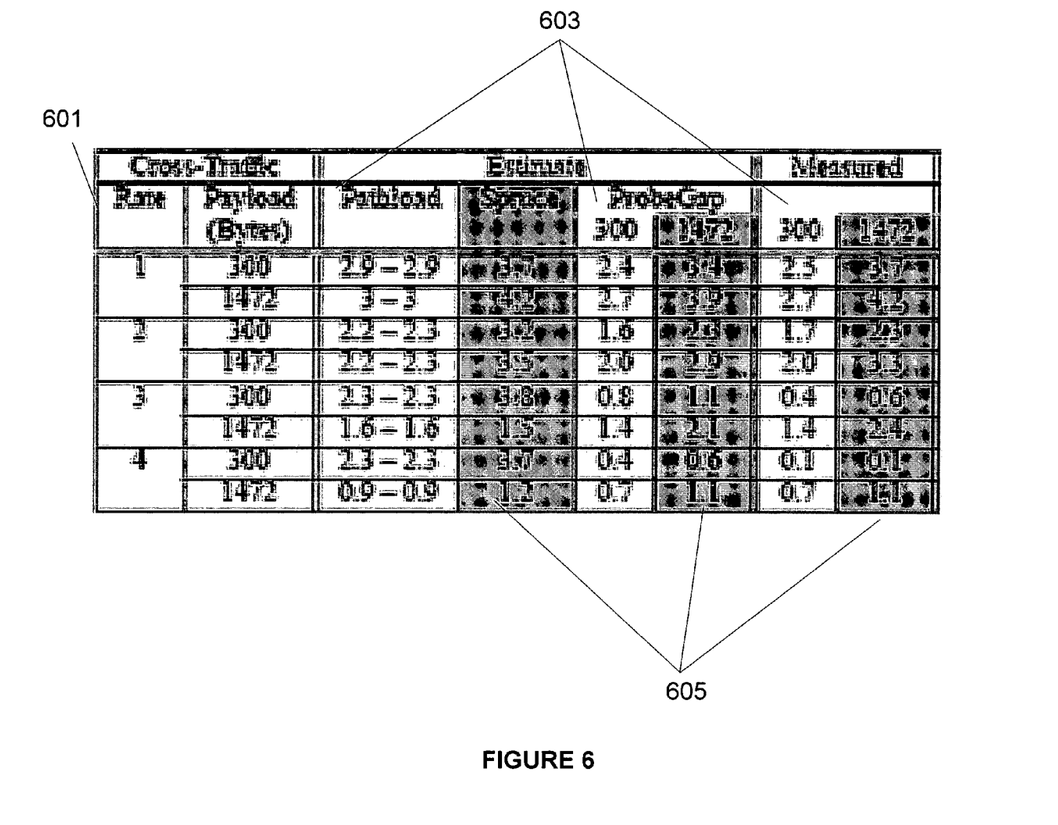
FIG. 6 illustrates a chart showing estimation of available bandwidth under various loads for the single-rate case, using a number of estimation tools including a tool corresponding to an embodiment of the invention.

FIG. 6 illustrates the estimation of available bandwidth under various loads for the single-rate case. All numbers are in Mbps and the nominal channel capacity is 6 Mbps. The "Rate" column 601 for cross-traffic indicates offered rate, not achieved rate. The columns under headings "Estimate" and "Measured" are shaded according to the packet size used for the estimation and the measurement. The white columns 603 (300-byte packets) should be compared with each other and likewise the gray columns 605 (1472-byte packets) should be compared with each other.

Under low load conditions, Pathload's estimate agreed well with the available bandwidth measured with 300-byte packets (i.e., numbers in the penultimate column), irrespective of the cross-traffic packet size. On the other hand, Pathload overestimated the available bandwidth when the cross-traffic was high because it is a PRM-based tool. With a contention-based MAC, if a sender is sending at more than its fair share, and a second sender slowly starts ramping up its sending rate, then the first sender will eventually be "pushed back" by the MAC to its fair share, thereby giving the second flow its fair share as well. While this happens, the output rate of the PRM probes matches their input rate, and there is no increasing trend in the OWDs of the probe packets. The net result is that the estimate tends to the fair share rather than the available bandwidth.

Spruce's estimates were in good agreement with the measured available bandwidth when both the packet size used for cross-traffic and that used for validation were 1472 bytes. This is because Spruce also uses 1472-byte packets to probe the channel. On the other hand, when the cross-traffic packet size was 300 bytes, Spruce tended to significantly overestimate available bandwidth. For example, with a cross-traffic of 4 Mbps comprising 300-byte packets, Spruce estimated the available bandwidth to be 3.7 Mbps whereas the available bandwidth measuring with 1472-byte packets ("1472" sub-column under the "Measured" column) was only 0.1 Mbps. This overestimation was due to contention occurring on a per-packet basis, which results in only a small number (typically just one, due to MAC fairness) of the 300-byte cross-traffic packets being inserted between Spruce's pair of much larger probe packets.

As noted above, embodiments of the invention estimate the fraction of time the channel is free and multiply that estimate by the capacity to determine available bandwidth. However, since capacity depends on packet size, in an embodiment of the invention, the capacity value is selected corresponding to the packet size that we wish to estimate available bandwidth for (3.5 Mbps for 300-byte packets and 5.1 Mbps for 1472-byte packets). This mimics what an application interested in available bandwidth for its packet size might do. As a result, estimates for a given packet size show a good match to the measured available bandwidth for the corresponding packet size. However, embodiments of the invention may sometime overestimate the available bandwidth when the cross-traffic is high. The reason for this is that even when the channel is saturated with cross-traffic, there is a small chance that the probe packet will arrive exactly during the idle period between successive cross-traffic packets and then win the contention round. This would result in a small OWD, indicating an idle channel.

The following discussion focuses on the impact of the multirate environment discussed above on estimates provided by all the tools. The setup for all tests was as follows. The NICs on machines M1 and M2 were set to 54 Mbps. All estimation tools were run between these two machines. The NICs on machines M3 and M4 were set to 6 Mbps, and all cross-traffic was generated between these two machines. The capacity estimates produced by Pathrate were consistent with the channel capacity.

Figure 7:
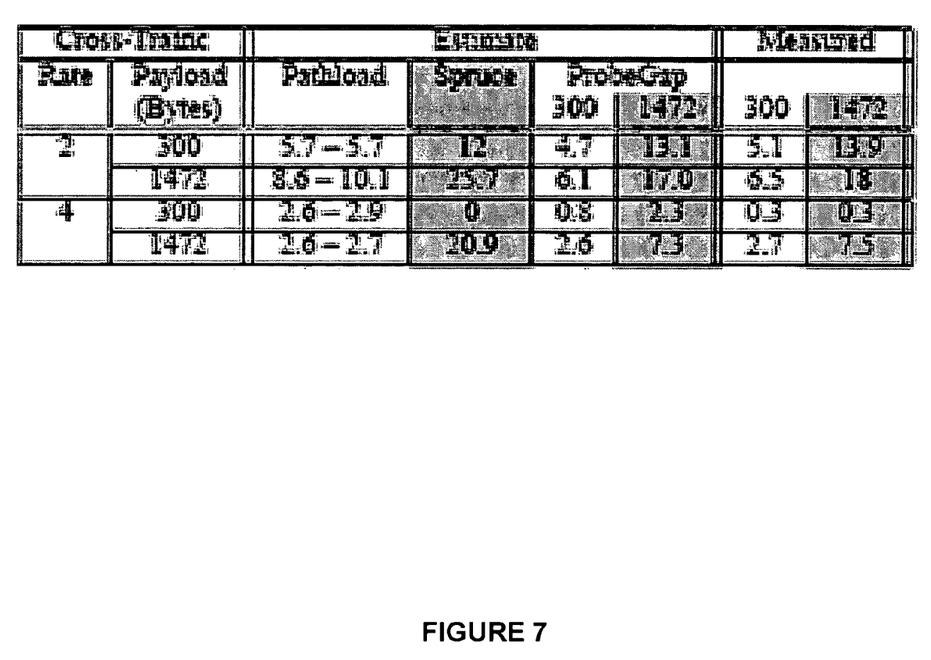
FIG. 7 illustrates a chart showing estimations of available bandwidth under various loads for the multi-rate case, using a number of estimation tools including a tool corresponding to an embodiment of the invention.

FIG. 7 shows the estimation of available bandwidth under various loads for the multi-rate case. All numbers are in Mbps and the estimation ran between M1-M2 (54 Mbps), while traffic was generated by M3-M4 (6 Mbps). The shading of columns is similar to that in FIG. 6.

With respect to the estimation of available bandwidth, we conducted experiments for the same set of parameters as in the single-rate case. The estimate provided by Pathload was comparable to the measured available bandwidth for 300-byte packets (i.e., same as the probe packet size used by Pathload). However, at a cross-traffic rate of 4 Mbps generated again using 300-byte packets, Pathload significantly overestimated the available bandwidth. This is because of the tendency towards the fair share, as noted above. When the cross-traffic was generated with 1472-byte packets, Path-load overestimated the available bandwidth. For instance, when 2 Mbps of cross-traffic was generated with 1472-byte packets, Path-load estimated the available bandwidth to be between 8.6-10.1 Mbps whereas the measured available bandwidth (using 300-byte packets) was only 6.5 Mbps. The reason for the overestimation was apparently that the cross-traffic on the 6 Mbps channel appeared as large bursts to the Pathload probes sent on the 54 Mbps channel. Thus, the Pathload probes tended to queue up behind the large cross-traffic bursts, and when the channel became free, the probes went out back-to-back. Even when Path-load's probing rate exceeded the available bandwidth, typically there were only a few large steps in the OWD sequence, not the steady increasing trend that Pathload expects.

Spruce tended to slightly overestimate available bandwidth at low cross-traffic rates. But it reported zero available bandwidth when 4 Mbps of cross-traffic is generated by 300-byte packets, which closely matched the measured available bandwidth of 0.3 Mbps. The reason Spruce's estimate was zero in this case, whereas it was 3.7 Mbps in the single-rate case, was apparently that each 300-byte cross-traffic packet appeared as a large burst of cross-traffic on the 54 Mbps channel. Given the relative speeds of the two channels, a single such burst is comparable to or larger than the 1472-byte size of the probe packets sent on the 54 Mbps channel. Since the cross-traffic saturates the 6 Mbps channel, there is always a cross-traffic packet waiting to be transmitted. Due to 802.11's attempt at MAC fairness, one cross-traffic packet (equivalent to a burst at least as large as a single 1472-byte probe packet) tended to get inserted on average between Spruce's pair of 1472-byte probes, resulting in the zero estimate. In contrast, in the single-rate case, the amount of cross-traffic that was inserted on average between the probes was only 300 bytes, so Spruce's available bandwidth estimate was higher (3.7 Mbps), although the channel was fully saturated in this case as well.

However, when 1472-byte packets were used to generate the cross-traffic while holding the cross-traffic rate the same (4 Mbps), Spruce significantly overestimated available bandwidth (it estimated available bandwidth to be 20.9 Mbps whereas the value measured with 1472-byte packets is 7.5 Mbps). Cross-traffic appeared as very large bursts. Each 1472-byte cross-traffic packet appeared as a burst roughly 5 times as large as that due to a 300-byte cross-traffic packet, and there could be multiple such packets in a single burst. This made it difficult for Spruce's sampling process to obtain an accurate estimate of the volume of cross-traffic. In addition, the transmission time of the bursts of cross-traffic (often several milliseconds) ran afoul of the threshold used in Spruce to disambiguate between genuine cross-traffic-induced packet gaps and gaps due to OS context switches. So the samples corresponding to the large bursts were ignored, resulting in the overestimate. The burstiness in the cross-traffic caused by the interference between multirate links makes accurate sampling difficult.

As can be seen, embodiments of the invention produced good estimates at low cross-traffic rates (viz., 2 Mbps cross-traffic regardless of the cross-traffic packet size and 4 Mbps cross-traffic generated with 1472-byte packets). In summary, (1) non-FIFO scheduling and frame-level contention in 802.11 causes problems for both the PGM (Spruce) and PRM (Pathload) methods, and (2) interference between links operating at different rates in 802.11 can make cross-traffic appear bursty for the faster link, exacerbating the problems. Embodiments of the invention provide a one-way-delay based technique for estimating available bandwidth that alleviates the problems caused by non-FIFO scheduling, frame-level contention, and bursty cross-traffic.

Embodiments of the invention are illustrated as being implemented in a suitable computing environment. Although not required, the invention is described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced in a variety of computer system configurations, including hand-held devices, multi-processor systems, and microprocessor-based or programmable consumer electronics devices. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

Figure 8:
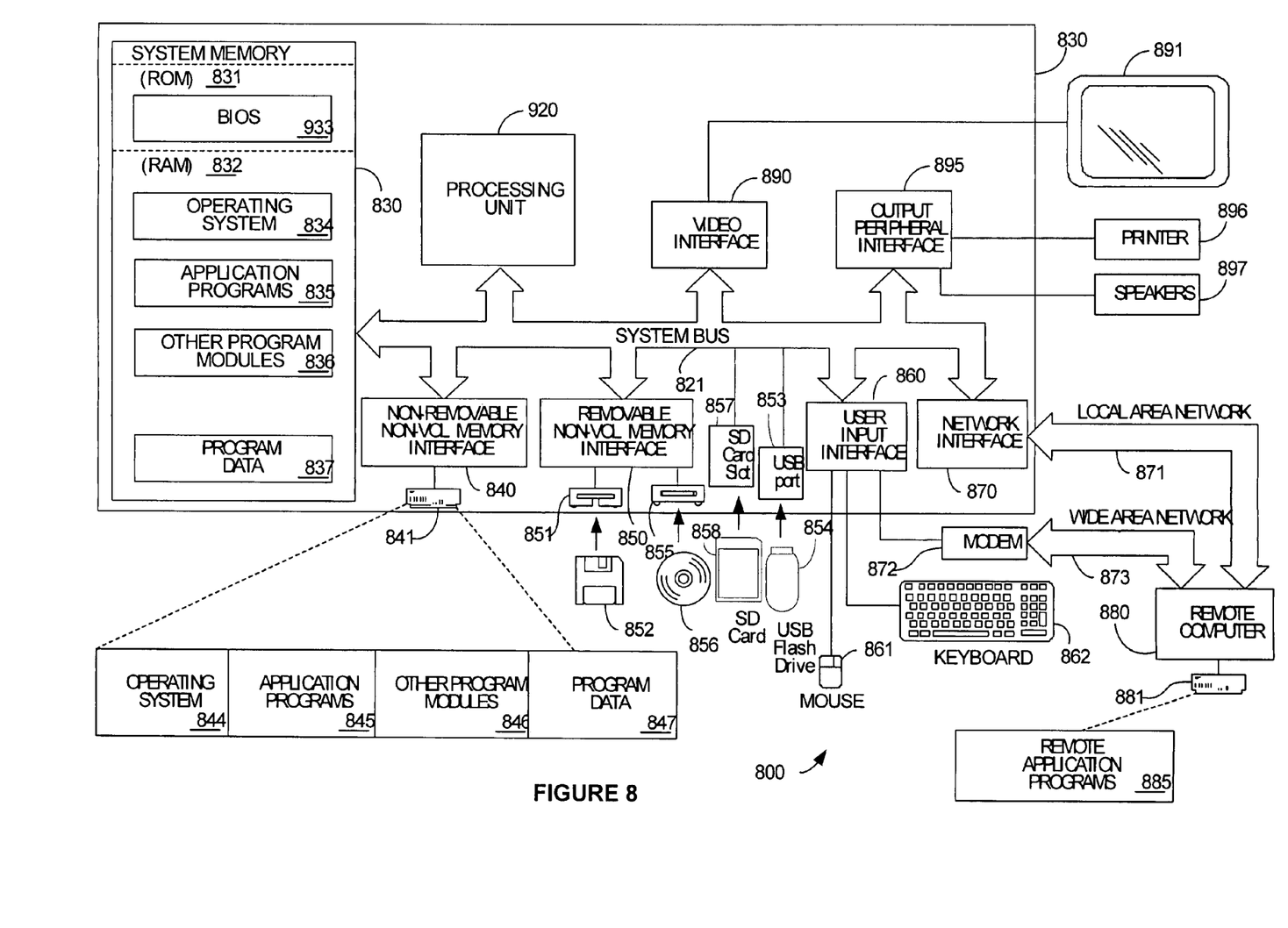
FIG. 8 is a schematic diagram illustrating an exemplary architecture of a computing device that may be used as part of a wireless network implementing a communication configuration process in accordance with an embodiment of the invention.

FIG. 8 illustrates an example of a suitable computing system environment 800 in which the invention may be implemented. The computing system environment 800 is only one example of a suitable computing environment and is not intended to suggest any limitation as to the scope of use or functionality of the invention. Nor should the computing environment 800 be interpreted as having any dependency or requirement relating to any one or combination of components illustrated in the exemplary operating environment 800. Although computing devices suitable for use within at least one embodiment of the invention do include each component illustrated in the exemplary operating environment 800, another embodiment of the invention utilizes a device that excludes some or all non-essential components, for example, input/output devices other than those required for network communications.

That said, one example system for implementing the invention includes a general purpose computing device in the form of a computer 810. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures.

The computer 810 typically includes a variety of computer-readable media. Computer-readable media can be any available media that can be accessed by the computer 810 and include both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, optical disk storage, magnetic cassettes, magnetic tape, magnetic disk storage or other magnetic storage devices, or any other medium which can be used to store the desired information and which can be accessed by the computer 810. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above are included within the scope of computer-readable media.

The system memory 830 includes computer storage media in the form of volatile and/or nonvolatile memory such as read only memory (ROM) 831 and random access memory (RAM) 832. By way of example, and not limitation, FIG. 8 illustrates operating system 834, application programs 835, other program modules 836 and program data 837.

The computer 810 may also include other removable and non-removable, volatile and nonvolatile computer storage media. By way of example only, FIG. 8 illustrates a hard disk drive 841 that reads from or writes to non-removable, non-volatile magnetic media, a magnetic disk drive 851 that reads from or writes to a removable, nonvolatile magnetic disk 852, and an optical disk drive 855 that reads from or writes to a removable, nonvolatile optical disk 856 such as a CDROM. Other computer storage media that can be used in the exemplary operating environment include, but are not limited to, magnetic tape cassettes, flash memory cards, DVDs, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The computer system may include interfaces for additional types of removable non-volatile storage devices. For instance, the computer may have a USB port 853 that can accept a USB flash drive (UFD) 854, or a SD card slot 857 that can accept a Secure Digital (SD) memory card 858. A USB flash drive is a flash memory device that is fitted with a USB connector that can be inserted into a USB port on various computing devices. A SD memory card is a stamp-sized flash memory device. Both the USB flash drive and SD card offer high storage capacity in a small package and high data transfer rates.

The drives and their associated computer storage media, discussed above and illustrated in FIG. 8, provide storage of computer-readable instructions, data structures, program modules and other data for the computer 810. In FIG. 8, for example, hard disk drive 841 is illustrated as storing an operating system 844, application programs 845, other program modules 846 and program data 847. Note that these components can either be the same as or different from operating system 834, application programs 835, other program modules 836, and program data 837. Operating system 844, application programs 845, other program modules 846, and program data 847 are given different numbers herein to illustrate that, at a minimum, they are different copies. A user may enter commands and information into the computer 810 through input devices such as a tablet, or electronic digitizer, 864, a microphone 863, a keyboard 862 and pointing device 861, commonly referred to as a mouse, trackball or touch pad. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 by way of an interface, such as a video interface 890. The monitor 891 may also be integrated with a touch-screen panel or the like. Note that the monitor and/or touch screen panel can be physically coupled to a housing in which the computing device 810 is incorporated, such as in a tablet-type personal computer. In addition, computers such as the computing device 810 may also include other peripheral output devices such as speakers 897 and printer 896, which may be connected through an output peripheral interface 894 or the like.

The computer 810 preferably operates or is adaptable to operate in a networked environment using logical connections to one or more remote computers, such as a remote computer 880. The remote computer 880 may be a personal computer, a server, a router, a peer device or other network node, and typically includes some or all of the elements described above relative to the computer 810, although only a memory storage device 881 has been illustrated in FIG. 8. The logical connections depicted in FIG. 8 include a LAN 871 and a WAN 873, but may also include other networks.

When used in a LAN environment, the computer 810 is connectable to the LAN 871 through a network interface or adapter 870. The computer 810 may also include a modem 872 or other means for establishing communications over the WAN 873. The modem 872, which may be internal or external, may be connected to the system bus 821 by way of the user input interface 860 or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

It will be appreciated that although the examples above involve the use of OWD to estimate bandwidth, the round trip time (RTT) may be used instead of the OWD to estimate the available bandwidth. In this embodiment of the invention, the same principles disclosed above are used, with simple changes to account for the use of RTT instead of OWD as will be appreciated by those of skill in the art.

It will be appreciated that a new and useful system for network bandwidth estimation has been described. Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, patents and appendices, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Any recitation of ranges of values herein is merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. A method of measuring available bandwidth over a network path between a source machine and a destination machine, the method comprising:

receiving a series of probes, each containing a local timestamp;

recording a respective destination time stamp for each probe indicating the time at which the probe was received at the destination device;

computing a set of one way delays by differencing the local timestamp and the destination time stamp to compute the respective one way delay experienced by each probe over the network path; and calculating an estimate of bandwidth available on the network path based on the set of one way delays, wherein calculating an estimate of bandwidth available on the network path based on the set of one way delays further comprises:

computing the cumulative distribution function of the set of one way delays; and identifying a knee of the cumulative distribution function, wherein identifying a knee of the cumulative distribution function comprises:

calculating the slope of the cumulative distribution function before and after each of a plurality of points in the cumulative distribution function;

determining the angle between the before and after slopes associated with each of the plurality of points; and identifying the point of the cumulative distribution function with the largest angle as the knee, wherein the point of the cumulative distribution function with the largest angle has an angle that is greater than or equal to a predetermined threshold, and wherein calculating an estimate of bandwidth available on the network path based on the set of one way delays further comprises calculating an estimate of bandwidth available on the network path based on the identified knee of the cumulative distribution function.

2. The method according to claim 1, further comprising normalizing the set of one way delays prior to calculating an estimate of bandwidth available on the network path based on the set of one way delays, wherein normalizing the set of one way delays comprises subtracting the value of the smallest one way delay from each delay value in the set of one way delays, whereby the smallest normalized one way delay in the set of one way delays is zero.

3. The method according to claim 1, wherein receiving a series of probes comprises receiving a series of Poisson-spaced probes.

4. The method according to claim 1, wherein calculating the slope of the cumulative distribution function before and after each of a plurality of points in the cumulative distribution comprises, for each of the plurality of points, applying a linear regression to a group of points within a predetermined distance before the point and applying a linear regression to a group of points within a predetermined distance after the point.

5. The method according to claim 1, wherein the plurality of points in the cumulative distribution function excludes one or more points having a normalized one way delay greater than a predetermined maximum value.

6. A computer-readable storage medium encoded with computer-executable instructions for performing the method according to claim 1.

7. A computer-readable storage medium encoded with computer-executable instructions for performing a method of measuring available bandwidth over a network path between a source machine and a destination machine, the instructions comprising instructions for:

sending a series of probes, each containing a local timestamp;

computing a set of respective round trip times experienced by each probe over the network path; and calculating an estimate of bandwidth available on the network path based on the set of respective round trip times, the calculating comprising computing the cumulative distribution function of the set of respective round trip times;

calculating a knee of the cumulative distribution function; and estimating available bandwidth based on the location of the knee, wherein the cumulative distribution excludes one or more points having a normalized round trip time greater than a predetermined maximum value.

8. The computer-readable storage medium according to claim 7, further comprising instructions for normalizing the set of respective round trip times prior to calculating an estimate of bandwidth available on the network path based on the set of respective round trip times, wherein normalizing the set of respective round trip times comprises subtracting the value of the smallest respective round trip times from each round trip time value in the set of respective round trip times, whereby the smallest normalized round trip time in the set of respective round trip times is zero.

9. The computer-readable storage medium according to claim 7, wherein the instructions for sending a series of probes comprise instructions for sending a series of Poisson-spaced probes.

10. A method of measuring available bandwidth over a network path between a source machine and a destination machine, the method comprising:

receiving a series of probe groups, each probe group containing a plurality of packets, each packet having a local timestamp;

receiving a respective destination time stamp for each packet indicating the time at which the packet was received at the destination machine;

computing a set of one way delays by differencing the local timestamp and the destination time stamp to compute the respective one way delay experienced by each packet over the network path;

for each probe group, identifying a maximum one way delay experienced by one of the probe group packets, wherein the maximum one way delay is greater than all other one way delays experienced by packets in the group, to identify a set of maximum one way delays comprising the maximum one way delay for each probe group; and calculating an estimate of bandwidth available on the network path based on the set of maximum one way delays, the calculating comprising:

forming the cumulative distribution function for the set of maximum one way delays;

identifying a point in the cumulative distribution function wherein the point separates a first region of the cumulative distribution function having a first slope from a second region of the cumulative distribution function having a second slope that is lower than the first slope; and calculating an estimate of bandwidth available on the network path based on the delay value at the point.

11. A computer-readable storage medium encoded with computer-executable instructions for performing the method according to claim 10.

12. A computer-readable storage medium encoded with computer-executable instructions for performing the method according to claim 7.

* * * * *